United States Patent
Makoto et al.

(10) Patent No.: US 11,434,143 B2
(45) Date of Patent: Sep. 6, 2022

(54) POLYCRYSTALLINE YAG SINTERED BODY AND PRODUCTION METHOD THEREOF

(71) Applicant: JX Nippon Mining & Metals Corporation, Tokyo (JP)

(72) Inventors: Mikami Makoto, Ibaraki (JP); Yoshiki Yamazaki, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 204 days.

(21) Appl. No.: 16/482,356

(22) PCT Filed: Oct. 29, 2018

(86) PCT No.: PCT/JP2018/040023
§ 371 (c)(1),
(2) Date: Jul. 31, 2019

(87) PCT Pub. No.: WO2019/187287
PCT Pub. Date: Oct. 3, 2019

(65) Prior Publication Data
US 2021/0163310 A1    Jun. 3, 2021

(30) Foreign Application Priority Data
Mar. 30, 2018 (JP) .............................. JP2018-066842

(51) Int. Cl.
*C04B 35/50* (2006.01)
*C01F 17/34* (2020.01)
*C09K 11/77* (2006.01)

(52) U.S. Cl.
CPC .............. *C01F 17/34* (2020.01); *C04B 35/50* (2013.01); *C09K 11/7706* (2013.01); *C01P 2002/30* (2013.01); *C01P 2006/60* (2013.01)

(58) Field of Classification Search
CPC ..... C09K 11/7706; C04B 35/50; C04B 35/51; C04B 35/575
See application file for complete search history.

(56) References Cited

U.S. PATENT DOCUMENTS

| 7,253,129 B2 | 8/2007 | Takagimi et al. |
| 2005/0215419 A1* | 9/2005 | Takagimi ............ C04B 35/6455 501/152 |
| 2015/0069299 A1* | 3/2015 | Pan .................... C09K 11/7774 252/301.4 H |

FOREIGN PATENT DOCUMENTS

| CN | 102211942 A | 10/2011 |
| JP | 2005-035154 A | 2/2005 |

(Continued)

OTHER PUBLICATIONS

Extended European Search Report, issued for counterpart European Patent Application No. 18880077.5, dated Aug. 28, 2020.
Inon Moshe et al., "Use of Polycrystalline Nd:YAG Rods to Achieve Pure Radially or Azimuthally Polarized Beams from High-Average-Power Lasers", Optic Letters, Optical Society of America, US, vol. 35, No. 15, pp. 2511-2513, Aug. 2010.

(Continued)

*Primary Examiner* — Matthew E. Hoban
(74) *Attorney, Agent, or Firm* — Howson & Howson LLP

(57) ABSTRACT

A polycrystalline YAG sintered body, wherein, when dimensions of a smallest rectangular solid surrounding a YAG sintered body are A mm×B mm×C mm, a maximum value (A, B, C) is 150 mm or less, a minimum value (A, B, C) is more than 20 mm and 40 mm or less, and an optical loss coefficient when light of a wavelength of 300 to 1500 nm (excluding wavelengths which result in absorption of light by an additive element) is transmitted therethrough is 0.002 $cm^{-1}$ or less. Moreover, a polycrystalline YAG sintered body, wherein, when dimensions of a smallest rectangular solid surrounding a YAG sintered body are A mm×B mm×C mm, a maximum value (A, B, C) is more than 150 mm and 300 mm or less, a minimum value (A, B, C) is more than 5 mm and 40 mm or less, and an optical loss coefficient when (Continued)

light of a wavelength of 300 to 1500 nm (excluding wavelengths which result in absorption of light by an additive element) is transmitted therethrough is 0.002 cm$^{-1}$ or less. An object of an embodiment of the present invention is to provide a large and transparent polycrystalline YAG sintered body and its production method.

8 Claims, 1 Drawing Sheet

(56) References Cited

FOREIGN PATENT DOCUMENTS

| JP | 2006-315878 A | 11/2006 |
|----|---------------|---------|
| JP | 2009-084060 A | 4/2009 |
| JP | 2013-209245 A | 10/2013 |
| WO | 02/057198 A2 | 7/2002 |

OTHER PUBLICATIONS

Y. Chen et al., "High-Efficiency High-Power QCW Diode-Side-Pumped Zigzag Nd:YAG Ceramic Slab Laser", Applied Physics B: Lasers and Optics, vol. 111, No. 1, pp. 111-116, Apr. 2013.

Dinh T H et al., "120 Watt Continuous Wave Solar-Pumped Laser with a Liquid Light-Guide Lens and an Nd:YAG Rod", Optic Letters, Optical Society of America, US, vol. 37, No. 13, pp. 2670-2672, Jul. 2012.

Yagi, Hideki, "Development of Polycrystalline Laser Ceramics", Thesis for a Doctoral Degree, the University of Electro-Communications Graduate School of Electro-Communications, Dec. 2006 (Partial English Translation Provided—Section "2.1.2 YAG Material Powder by Wet Process").

Chinese Office Action dated Jan. 24, 2022 issued by the Chinese Patent Office for corresponding CN Patent Application No. 201880036770.8.

* cited by examiner

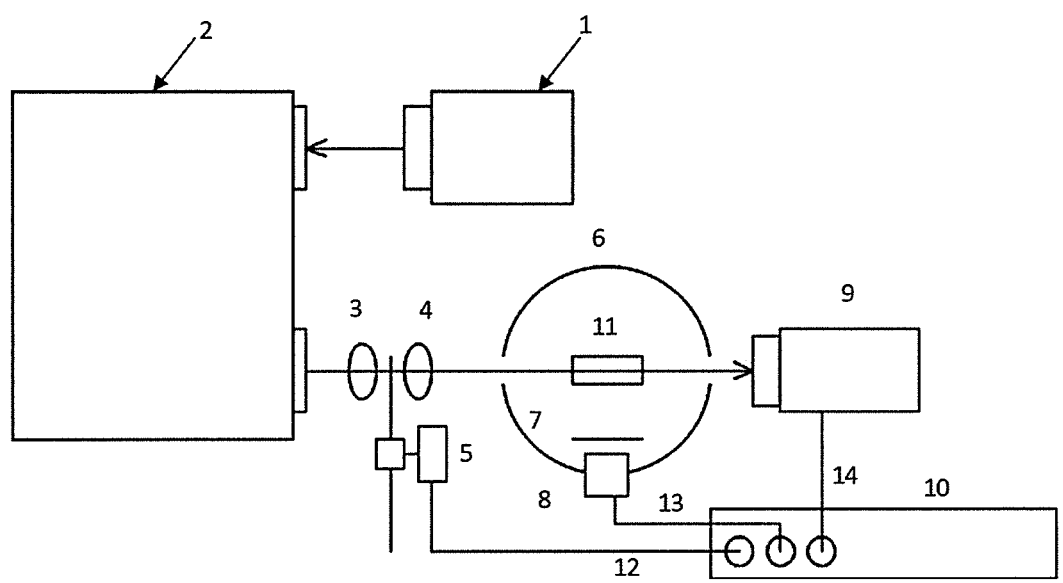

POLYCRYSTALLINE YAG SINTERED BODY AND PRODUCTION METHOD THEREOF

BACKGROUND

The present invention relates to a polycrystalline YAG (yttrium-aluminum-garnet) sintered body and its production method.

YAG (yttrium-aluminum-garnet) is a crystal of a garnet structure formed from a complex oxide of yttrium and aluminum ($Y_3Al_5O_{12}$). Conventionally, it is known that the substituted element becomes the emission center and yields strong fluorescence by 1) forming the Y element configuring YAG into a substitutional solid solution by adding an element from Ce (atomic number 57) to Yb (atomic number 70) among rare earth elements, or 2) forming the Al element configuring YAG into a substitutional solid solution by adding an element from Ti (atomic number 22) to Ni (atomic number 28) among transition metals, and this has been used to create a phosphor, a laser medium and the like. Moreover, since YAG with no additive element added thereto is likewise transparent in a visible light range and hard (hardness of 8.5), it can also be used as a window material that can be applied in harsh environments (plasma, etc.).

Such YAG ceramics have been from before used by embedding an easy-to-prepare powder shape into resin, or by growing monocrystal. However, while powder can be easily prepared, the light emission is easily scattered, and the luminous efficiency is not high. Meanwhile, while a monocrystal has less scattering and high luminous efficiency, because a monocrystal is grown from oxide melts at a high temperature near 2000° C., it is necessary to use extremely expensive iridium which has oxidation resistance at a high temperature, and, unless the growth rate is also set to be extremely slow at roughly 1 mm/hr, numerous defects will arise and deteriorate the transmittance, and also deteriorate the strength of the crystals themselves. Moreover, the grown monocrystal contains numerous microcracks, and there is a problem in that unexpected cracks would arise upon processing a monocrystal into a desired shape.

In recent years, it is now possible to produce polycrystalline YAG, in which pores (voids) existing at the grain boundary have been suppressed to the extent possible, according to the same molding/sintering method that is used for preparing general ceramics, and it is now known that this polycrystalline YAG exhibits superior transmission characteristics, albeit being slightly inferior to those of monocrystal. Moreover, because polycrystalline YAG is prepared via powder sintering as with ceramics, there is no segregation phenomenon of additive elements that is observed in the melt growth of monocrystal (phenomenon where a gradient is observed in the additive element concentration in the grown ingot), and the solubility limit of the additive element is also higher in comparison to the case of monocrystal growth. Thus, it is possible to prepare a bright phosphor or a laser medium with higher emission intensity of a level capable of negating the transmission characteristics that are inferior to monocrystal. As inventions related to a polycrystalline YAG sintered body, there are, for instance, Patent Documents 1 and 2.

Since a laser is able to create a high light quantity density, it is possible to locally apply an extremely strong electromagnetic field to a substance, and numerous researches applying a laser are being conducted in recent years. For example, these applications include following; cutting metal and the like (laser processing), applying to a light source for ultrafine lithography via forming a plasma by irradiating droplets of molten tin or the like with a laser and consequently generating extreme ultraviolet radiation, and efficiently conducting heavy particles acceleration with a laser to help for cancer treatment irradiating an affected part with the accelerated heavy particles. The laser used in these fields is referred to as a high-power laser and this is a laser having particularly strong optical intensity among various lasers. Glass or the like added neodymium or ytterbium has previously been used as a laser medium for a high-power laser because the production of large products is relatively easy.

However, because glass or the like added neodymium or the like has weak mechanical strength and inferior thermal conductivity, there was a problem in that, once oscillated, it takes several hours to cool, and continuous use was difficult. With respect to this point, since foregoing YAG has high mechanical strength and favorable thermal conductivity, it is particularly suitable as a laser medium for use in a high-power laser. Moreover, as the laser medium is larger, it is possible to build a higher output laser, and, since enlargement is also easy as YAG is prepared via powder sintering, it could be said that polycrystalline YAG (sintered body), which exhibits qualities that are comparable to a monocrystal, is the optimal laser medium. Meanwhile, while it has been more than 20 years since polycrystalline YAG capable of laser oscillation was first created in 1995, the maximum size was previously only around φ100 mm.

CITATION LIST

Patent Documents

[Patent Document 1] Japanese Patent No. 4237707
[Patent Document 2] Japanese Patent No. 5019380

SUMMARY

An object of the present invention is to provide a large and transparent polycrystalline YAG sintered body and its production method.

An embodiment of the present invention is a polycrystalline YAG sintered body, wherein, when dimensions of a smallest rectangular solid surrounding a YAG sintered body are A mm×B mm×C mm, a maximum value of A, B, C is 150 mm or less, a minimum value of A, B, C is 20 mm or more and 40 mm or less, and an optical loss coefficient when light of a wavelength of 300 to 1500 nm (excluding wavelengths which result in absorption of light by an additive element) is transmitted therethrough is 0.002 $cm^{-1}$ or less.

Moreover, an embodiment of the present invention is a polycrystalline YAG sintered body, wherein, when dimensions of a smallest rectangular solid surrounding a YAG sintered body are A mm×B mm×C mm, a maximum value of A, B, C is 150 mm or more and 300 mm or less, a minimum value of A, B, C is 5 mm or more and 40 mm or less, and an optical loss coefficient when light of a wavelength of 300 to 1500 nm (excluding wavelengths which result in absorption of light by an additive element) is transmitted therethrough is 0.002 $cm^{-1}$ or less.

Moreover, an embodiment of the present invention is a method of producing the foregoing polycrystalline YAG sintered body, wherein a mixed powder containing a $Y_2O_3$ powder and an $Al_2O_3$ powder is molded to prepare a compact having a relative density of 60% or higher, the compact is sintered at 1600 to 1900° C. while maintaining a degree of vacuum of $1\times10^{-2}$ Pa or less in a warming step and a holding step, and, after sintering, a cooling rate is set to be 100° C./hour or less up to 1100° C.

According to the foregoing embodiments of the present invention, it is possible to stably produce a large and transparent polycrystalline YAG sintered body.

BRIEF DESCRIPTION OF THE DRAWINGS

FIG. 1 is a schematic diagram of the scattered light measuring system according to an embodiment of the present invention.

DETAILED DESCRIPTION

In recent years, research for applying a laser to the processing of materials is being advanced, and a laser with a higher output is in demand. Conventionally, YAG ceramics added Nd or Yb have been used as the laser medium, and if it is possible to produce larger YAG ceramics that were unavailable conventionally, more exciting light can be emitted and, therefore, a high-output laser can be prepared.

Since polycrystalline YAG is prepared via powder sintering, under normal circumstances, it can be produced into an arbitrary shape. Nevertheless, as the sintered body is enlarged, sintering nonuniformity will remain at the center part thereof, and as a whole will be an opaque sintered body. For example, conventionally, when one side (or diameter) of the sintered body reaches 100 mm, the other side (or thickness) will only be roughly 10 mm, and 20 mm was the limit. Moreover, when one side (or diameter) of the sintered body becomes greater than 150 mm, it becomes extremely difficult to create a sintered body in which the other side (or thickness) is larger than 5 mm.

As a result of intense study regarding the sintering process of a large-size YAG sintered body, the present inventors discovered that, because sintering begins from the outer periphery, residual holes (sintering nonuniformity) tend to remain at the center part thereof, and this became more notable as the sintered body is enlarged. Meanwhile, the present inventors discovered that, rather than preparing a powder having a YAG composition in advance and sintering the powder to produce polycrystalline YAG as described in Patent Document 1, creating a compact from a powder obtained by mixing the individual raw materials of $Y_2O_3$, $Al_2O_3$ and the like and performing reactive sintering of creating polycrystalline YAG while heating the compact and causing the compact to react, is more advantageous in terms of enlarging the sintered body.

Based on this kind of discovery, the YAG sintered body according to an embodiment of the present invention is characterized in that, when dimensions of a smallest rectangular solid surrounding the sintered body are A mm×B mm×C mm, a maximum value of A, B, C is 150 mm or less, and a minimum value of A, B, C is more than 20 mm and 40 mm or less, or, when dimensions of a smallest rectangular solid surrounding the sintered body are A mm×B mm×C mm, a maximum value of A, B, C is more than 150 mm more and 300 mm or less, and a minimum value of A, B, C is more than 5 mm and 40 mm or less, and an optical loss coefficient when light of a wavelength of 300 to 1500 nm (excluding wavelengths which result in absorption of light by an additive element) is transmitted therethrough is 0.002 $cm^{-1}$ or less. If the optical loss coefficient is 0.002 $cm^{-1}$ or less, it could be said that the transmission characteristics are superior, and it will be possible to produce a bright phosphor or a laser medium with higher emission intensity. It could be said that this kind of large-sized and transparent polycrystalline YAG sintered body was previously unavailable, and is novel.

The foregoing YAG sintered body is prepared based on the powder sintering method, is polycrystalline, and has crystals of a garnet structure formed from a complex oxide of yttrium and aluminum ($Y_3Al_5O_{12}$). The Y element configuring the foregoing YAG may be formed into a substitutional solid solution by adding an element from Ce (atomic number 57) to Yb (atomic number 70) among rare earth elements, or the Al element configuring the foregoing YAG may be formed into a substitutional solid solution by adding an element from Ti (atomic number 22) to Ni (atomic number 28) among transition metals. In this disclosure, these elements are referred to as "additive elements". The substituted element will become the emission center and yield strong fluorescence. Of course, the YAG sintered body according to an embodiment of the present invention may also be YAG itself without any additive element added thereto.

With the YAG sintered body according to an embodiment of the present invention, when dimensions of a smallest rectangular solid (virtual) surrounding the sintered body are A mm×B mm×C mm, a maximum value of A, B, C; that is, the largest value of A, B, C, is 150 mm or less, and a minimum value of A, B, C; that is, the smallest value of A, B, C, is more than 20 mm and 40 mm or less, and more preferably 30 mm or more. Otherwise, a maximum value of A, B, C; that is, the largest value of A, B, C, is more than 150 mm and 300 mm or less, and a minimum value of A, B, C; that is, the smallest value of A, B, C, is more than 5 mm and 40 mm or less, and more preferably 10 mm or more. In this application, a sintered body of these dimensions is referred to as a "large-size" or "enlarged" sintered body. Moreover, while the dimensions of the foregoing sintered body are the dimensions after sintering (immediately after sintering is completed), those with smaller dimensions as a result of being cut shall fall within the scope of the present invention so as long as they do not deviate from the subject matter of this invention. Moreover, the shape of the sintered body is not limited to a disk shape, and may also be a rectangular solid.

A conventionally known polycrystalline YAG laser medium has a diameter of roughly 100 mm and a thickness of roughly 10 mm, but when this is enlarged, because the sintered body is formed from multiple raw materials (components) and they each have different physical properties, it was difficult to perform uniform sintering reaction. Furthermore, since high transparency is demanded across the entire in-plane for use in a laser medium, it was extremely difficult to enlarge the YAG sintered body in comparison to other uses. However, the present invention is able to realize a YAG sintered body, which has a considerably larger size in comparison to convention YAG sintered bodies, for the first time based on the method described later, and also achieved a low optical loss coefficient. Furthermore, as a result of using this kind of large-size laser medium, it is possible to construct a high-output laser.

The optical loss coefficient in an embodiment of the present invention is the optical loss coefficient in cases where light of a wavelength, which will not result in absorption of light by an additive element, is transmitted. For example, when no additive element is introduced, the optical loss coefficient in a wavelength range of 300 to 1500 nm is measured. Moreover, for instance, when Nd is added, because light is absorbed at a wavelength of 300 to 1000 nm, the optical loss coefficient is measured at a wavelength excluding the foregoing wavelength; for instance, the optical loss coefficient is measured at a wavelength of 1064 nm. When the sintered body becomes opaque due to sintering nonuniformity or other reasons, because the optical loss coefficient will deteriorate across the entire measurement wavelength range (300 to 1500 nm), there will be no particular problem even when the optical loss coefficient of the wavelength range, which will result in the absorption of light by an additive element, is excluded as described above. The absorption wavelength of light by an additive element can be confirmed in advance, for instance, by preparing a YAG monocrystal introduced an additive element and measuring the absorption of such a YAG monocrystal.

The optical loss coefficient is measured as follows in the embodiment of the present invention.

FIG. 1 shows a schematic diagram of the scattered light measuring system. Light from a light source 1 (halogen lamp) passes through a spectrometer 2, and is emitted as monochromatic light of a specific wavelength that was selected. This light is converted into parallel light with two lenses 3, 4, and caused to enter an integrating sphere 6. A photodetector (photomultiplier) 9 is placed at the position where the light passes through the integrating sphere 6 to observe the intensity of the transmitted light. A signal 14 thereof is input to a lock-in amplifier 10.

Meanwhile, a separate photodetector (photomultiplier) 8 is placed, via a baffle plate 7, at a position that forms a 90-degree angle with the advancing direction of the transmitted light within the integrating sphere. The photodetector 8 measures the intensity of the scattered light. Meanwhile, the baffle plate 7 is inserted for eliminating any variance in strength resulting from the directional dependence of the scattered light to be measured due to the direct entry of the scattered light. A signal 13 from the photodetector 8 is also input to the lock-in amplifier 10. A chopper 5 is placed between the lenses 3, 4 to turn ON/OFF the light at a constant frequency (frequency f), and a signal 12 thereof is also input as a reference signal to the lock-in amplifier 10.

Consequently, a measurement signal is input in a state of being modulated at the frequency f, and a desired signal strength, after the modulator is eliminated by the lock-in amplifier 10, is obtained. Generally speaking, the natural world contains a noise component referred to as a 1/f fluctuation, and the noise increases as the frequency f decreases, and the noise decreases as the frequency f increases. Adopted is a configuration of reducing the influence of noise from the outside world as a result of performing measurement at a large frequency f based on modulation with the chopper, and thereby enabling more accurate measurement.

While a sample 11 to be measured is placed at the center of the integrating sphere, before such placement, the transmitted light intensity $I(T)_0$ and the background scattered light intensity $I(S)_0$ are foremost measured without placing the sample. Next, multiple samples having a different cylindrical thickness and in which the entire surface thereof has been polished (thickness $L_n$ (n=1, 2, . . . )) are placed at a center 11 of the integrating sphere so that the transmitted light becomes perpendicular to the cylindrical bottom face, and the transmitted light intensity $I(T)_n$ and the scattered light intensity $I(S)_n$ are measured. Subsequently, the surface scattering coefficients R(T), R(S) and the optical loss coefficients A(T), A(S) are obtained by performing fitting treatment with the least squares method based on the following formulas.

Furthermore, the larger value of the obtained A(T), A(S) is adopted as the optical loss coefficient value.

$$\frac{I(T)_n}{I(T)_0} = \frac{(1-R(T))^2 \exp(-A(T)L_n)}{1-R(T)^2 \exp(-2A(T)L_n)} \quad \text{[Mathematical 1]}$$

$$I(S)_n - I(S)_0 = 1 - \frac{(1-R(S))^2 \exp(-A(S)L_n)}{1-R(S)^2 \exp(-2A(S)L_n)} \quad \text{[Mathematical 2]}$$

The method of producing the polycrystalline YAG sintered body according to an embodiment of the present invention is now explained.

(Raw Material Powder)

A $Y_2O_3$ powder and an $Al_2O_3$ powder are prepared as raw materials. Moreover, as needed, an oxide powder (for instance, a $Nd_2O_3$ powder) containing the foregoing additive element is prepared. These raw material powders preferably have an average grain size of 0.3 to 10 μm. While the purity of the raw material powders is preferably 4N or higher, when the additive ratio of the additive element is small, the purity may be lowered according to the additive amount of the additive element. For example, when Nd is substituted for Y at 1%, even if 1% of impurities is contained in the $Nd_2O_3$ raw material powder, when $Y_2O_3$ and $Al_2O_3$ are combined, the impurity content of $Nd_2O_3$ will be 0.01% of the entire content, and this will correspond to a purity level of 4N.

Moreover, as sintering agents, powders of oxides containing Ca, Mg, Si, Zr, La (CaO, MgO, $SiO_2$, $ZrO_2$, $La_2O_3$), fluoride ($CaF_2$, etc.), carbonate ($CaCO_3$), and complex oxide ($MgAl_2O_4$, etc.) are prepared.

(Mixing)

The foregoing $Y_2O_3$ powder and $Al_2O_3$ powder, and, as needed, an oxide powder containing an additive element and a sintering agent, are placed in a mixer/pulverizer such as a ball mill, and subject to wet mixing for 4 to 20 hours with a ball mill which uses water as a solvent and alumina as a media. Here, it is preferable to add a moderate amount of dispersing agent to suppress mixing nonuniformity caused by the aggregation of the raw material powders. The mixing time may be determined within the foregoing range according to the grain size of the raw material powders to be used, ratio of the solvent and media relative to the raw materials, and media diameter.

After mixing, a sintering agent in a liquiform state may also be added to the slurry removed from the mixer/pulverizer. For example, metal salt dissolved in water (Ca$(C_3H_5O_3)_2$ or $CaCl_2$, lactic calcium aqueous solution) may be added. Furthermore, polyvinyl alcohol, an acrylic adhesive agent, basic aluminum chloride $(Al_2(OH)_nCl_{6-n})_m$ (0<n<6, m≤10), or lactic alumina may be added as a binder so as to attain 0.005 to 0.01 wt % relative to the amount of powder contained in the slurry.

(Granulation and Molding)

Next, the slurry after mixing is dried, and thereafter forced through a sieve, or spray dried, to prepare a granulated powder. The sintering agent may also be added at this point. For example, an organic metallic compound (Si$(OC_2H_5)_4$), or metal salt dissolved in water (Ca$(C_3H_5O_3)_2$ or $CaCl_2$, lactic calcium aqueous solution), may be added. Furthermore, polyvinyl alcohol, an acrylic adhesive agent, basic aluminum chloride $(Al_2(OH)_nCl_{6-n})_m$ (0<n<6, m≤10), or lactic alumina may be added as a binder so as to attain 0.005 to 0.01 wt % relative to the amount of powder.

The resulting product is placed in a mold (for instance, φ150 mm×40 mm), subject to cold press, and thereafter subject to CIP molding at 150 to 200 MPa. Upon preparing a compact, the foregoing polyvinyl alcohol or acrylic adhesive agent may be used as a binder, but there are cases where the organic constituents thereof run short during sintering, and those parts become gaps and deteriorate the sinterability. Meanwhile, by gelling basic aluminum chloride or lactic alumina during the drying process, it can bind with the surrounding powder, and, after sintering, remain as alumina components and reduce the gaps, and by using only basic aluminum chloride or lactic aluminum, or upon mixing it with polyvinyl alcohol or an acrylic adhesive agent, it is possible to considerably contribute to improving the relative density at the point before the sintering process described later, and improve the sinterability.

(Preliminary Heating)

Next, the compact is heated in the atmosphere at 100 to 300° C. for 4 to 6 hours to eliminate moisture, thereafter heated at 800 to 1000° C. for 1 to 3 hours to eliminate organic constituents contained in the sintering agent or binder, and the relative density of the compact is caused to be 60% or higher. As described above, while heating is performed for eliminating unnecessary components, if heating is rapidly performed at a high temperature (heating at 800 to 1000° C.), there are cases where the compact becomes cracked due to the sudden expansion of moisture. Thus, heating is preferably performed in two steps as described above. It is important to cause the relative density of the compact before sintering to be 60% or higher.

(Sintering and HIP)

When sintering the compact, it is desirable to maintain the degree of vacuum at $1 \times 10^{-2}$ Pa or less in the warming step and holding step. The biggest factor of decreasing the degree of vacuum in the warming step and holding step is considered to be residual moisture. $Y_2O_3$ used as the main raw material of polycrystalline YAG has absorbency, and $Al_2O_3$, while not at the same level as $Y_2O_3$, also has absorbency. The cause is considered to be the absorption of moisture in the air during the preparation of the compact or while loading the compact in the heating device. Particularly, in the case of a large-size compact, moisture is not absorbed evenly at all points, and there are differences locally. This will lead to the heating nonuniformity during reactive sintering, and, as a result, cause warping and an opaque area due to the density nonuniformity or thermal strain after sintering. Accordingly, it is important to adjust the degree of vacuum in the foregoing manner to perform uniform sintering.

Specifically, after loading the compact in a vacuum heating furnace, the compact is heated at 200 to 300° C. for roughly half a day while operating a rotary pump. Several hours later, the degree of vacuum deteriorated suddenly, and, while there were cases of exceeding 100 Pa, the degree of vacuum eventually settled down at 1 Pa or less. After heat treatment at 200 to 300° C., the compact is cooled to normal temperature, and sintered after confirming that the degree of vacuum is not deteriorating. The sintering is performed at 1700 to 1900° C. for 10 to 20 hours. Here, when sintering is performed in an atmosphere containing nitrogen, nitrogen will remain in the sintered body and cause the deterioration in density and, therefore, it is preferable to perform sintering in a vacuum, reducing atmosphere, or nitrogen free oxygen atmosphere.

Moreover, when heating is performed at a high temperature of 1700 to 1900° C., the cooling rate is fast after the heater is turned off, and the cooling rate is particularly fast at a part that is near the lateral face of the furnace, and, when the compact is enlarged, the heat distribution will increase within the sintered body, and the sintered body will become cracked due to the thermal strain that is generated within the sintered body. Accordingly, the cooling rate during the temperature-fall is preferably maintained at 100° C. or less/hour up to 1100° C.

Subsequently, the sintered body is subject to HIP (hot isostatic pressing) in an inert atmosphere such as an Ar atmosphere under the conditions of 1600 to 1800° C., 1 to 4 hours, and 100 to 200 MPa.

(Annealing)

Subsequently, the thus obtained sintered body is heated in the atmosphere at 1300 to 1500° C. for 5 to 15 hours. It is thereby possible to alleviate the internal stress remaining in the sintered body after HIP, and, when vacuum heating is performed, because there will be oxygen deficiency, it is possible to supplement the insufficient oxygen.

It is thereby possible to obtain a large and transparent polycrystalline YAG sintered body.

EXAMPLES

The present invention is now explained in detail with reference to the Examples and Comparative Examples. Note that these Examples are merely illustrative, and the present invention shall in no way be limited thereby. In other words, various modifications and other embodiments are covered by the present invention, and the present invention is limited only by the scope of its claims.

Example 1

A $Y_2O_3$ powder having an average grain size of 5 μm, an $Al_2O_3$ powder having an average grain size of 0.4 μm, and, as an additive element, a $Nd_2O_3$ powder having an average grain size of 5 μm were weighed in a predetermined amount, placed in a mixer/pulverizer, and subject to wet mixing for 5 hours with a ball mill which uses water as a solvent and alumina as a media to obtain a slurry. Lactic alumina was added as a binder to the slurry and mixed, dried, and thereafter spray-dried to obtain a granulated powder having an average grain size of 25 μm. A sintering agent (Si$(OC_2H_5)_4$) was additionally added thereto and mixed.

Next, the granulated powder was placed in a mold (φ210 mm×60 mm) and subject to cold press, and thereafter subject to CIP molding at 176 MPa. Next, the resulting compact was heated in an air atmosphere furnace at 100° C. for 5 hours, and then heated at 900° C. for 2 hours. At this point, the relative density had reached 60%.

Next, the compact was heated in a vacuum heating furnace at 200° C. for roughly half a day, while performing vacuum drawing, thereafter calcined at 1750° C. for 20 hours while maintaining a degree of vacuum of $1 \times 10^{-2}$ Pa or less, and thereafter cooled at a cooling rate of 100° C./hour or less up to 1100° C., and subsequently cooled slowly. Next, the compact was subject to HIP in an Ar atmosphere under the conditions of 1750° C., 147 MPa, and 4 hours, and heated in an air atmosphere furnace at 1300° C. for 10 hours to prepare a polycrystalline YAG sintered body having a size of φ150 mm×40 mm.

With regard to the thus obtained polycrystalline YAG sintered body, as a result of selecting 10 random in-plane points and measuring the optical loss coefficient of each point, the optical loss coefficient was 0.002 cm$^{-1}$ or less in each point at a wavelength of 1064 nm where there is no absorption of light by Nd.

Example 2

A $Y_2O_3$ powder having an average grain size of 5 μm, an $Al_2O_3$ powder having an average grain size of 0.4 μm, and, as an additive element, a $Nd_2O_3$ powder having an average grain size of 5 μm were weighed in a predetermined amount, placed in a mixer/pulverizer, and subject to wet mixing for 5 hours with a ball mill which uses water as a solvent and alumina as a media to obtain a slurry. Lactic alumina was added as a binder to the slurry and mixed, dried, and thereafter spray-dried to obtain a granulated powder having an average grain size of 25 μm. A sintering agent (Si$(OC_2H_5)_4$) was additionally added thereto and mixed.

Next, the granulated powder was placed in a mold (φ280 mm×40 mm) and subject to cold press, and thereafter subject to CIP molding at 176 MPa. Next, the resulting compact was heated in an air atmosphere furnace at 100° C. for 5 hours, and then heated at 900° C. for 2 hours. At this point, the relative density had reached 60%.

Next, the compact was heated in a vacuum heating furnace at 200° C. for roughly half a day, while performing vacuum drawing, thereafter calcined at 1750° C. for 20 hours while maintaining a degree of vacuum of $1 \times 10^{-2}$ Pa or less, and thereafter cooled at a cooling rate of 100° C./hour or less up to 1100° C., and subsequently cooled slowly. Next, the compact was subject to HIP in an Ar atmosphere under the conditions of 1750° C., 147 MPa, and 4 hours, and heated in an air atmosphere furnace at 1300° C. for 10 hours to prepare a polycrystalline YAG sintered body having a size of φ200 mm×20 mm.

With regard to the thus obtained polycrystalline YAG sintered body, as a result of selecting 10 random in-plane points and measuring the optical loss coefficient of each point, the optical loss coefficient was 0.002 $cm^{-1}$ or less in each point at a wavelength of 1064 nm where there is no absorption of light by Nd.

Example 3

A $Y_2O_3$ powder having an average grain size of 5 μm, an $Al_2O_3$ powder having an average grain size of 0.4 μm, and, as an additive element, a $Nd_2O_3$ powder having an average grain size of 5 μm were weighed in a predetermined amount, placed in a mixer/pulverizer, and subject to wet mixing for 5 hours with a ball mill which uses water as a solvent and alumina as a media to obtain a slurry. Lactic alumina was added as a binder to the slurry and mixed, dried, and thereafter spray-dried to obtain a granulated powder having an average grain size of 25 μm. A sintering agent (Si$(OC_2H_5)_4$) was additionally added thereto and mixed.

Next, the granulated powder was placed in a mold (φ400 mm×40 mm) and subject to cold press, and thereafter subject to CIP molding at 176 MPa. Next, the resulting compact was heated in an air atmosphere furnace at 100° C. for 5 hours, and then heated at 900° C. for 2 hours. At this point, the relative density had reached 60%.

Next, the compact was heated in a vacuum heating furnace at 200° C. for roughly half a day, while performing vacuum drawing, thereafter calcined at 1750° C. for 20 hours while maintaining a degree of vacuum of $1 \times 10^{-2}$ Pa or less, and thereafter cooled at a cooling rate of 100° C./hour or less up to 1100° C., and subsequently cooled slowly. Next, the compact was subject to HIP in an Ar atmosphere under the conditions of 1750° C., 147 MPa, and 4 hours, and heated in an air atmosphere furnace at 1300° C. for 10 hours to prepare a polycrystalline YAG sintered body having a size of φ300 mm×20 mm.

With regard to the thus obtained polycrystalline YAG sintered body, as a result of selecting 15 random in-plane points and measuring the optical loss coefficient of each point, the optical loss coefficient was 0.002 $cm^{-1}$ or less in each point at a wavelength of 1064 nm where there is no absorption of light by Nd.

Comparative Example 1

A $(Y_{1-x}Nd_x)_3Al_5O_3$ (x=0.01) powder having an average grain size of 1 μm synthesized based on the coprecipitation method was weighed in a predetermined amount, placed in a mixer/pulverizer, and subject to wet mixing for 5 hours with a ball mill which uses water as a solvent and alumina as a media to obtain a slurry. A polyvinyl alcohol aqueous solution was added as a binder to the slurry and mixed, dried, and thereafter spray-dried to obtain a granulated powder having an average grain size of 20 μm. A sintering agent (Si$(OC_2H_5)_4$) was additionally added thereto and mixed.

Next, the granulated powder was placed in molds (φ210 mm×40 mm, φ210 mm×50 mm) and subject to cold press, and thereafter subject to CIP molding at 176 MPa. Next, the resulting compacts were heated in an air atmosphere furnace at 100° C. for 5 hours, and then heated at 900° C. for 2 hours. At this point, the relative density was 60% or higher in both compacts.

Next, the compacts were calcined in a vacuum heating furnace at 1800° C. for 10 hours, and thereafter subject to HIP in an Ar atmosphere under the conditions of 1750° C., 147 MPa, and 4 hours. The compacts were thereafter heated in an air atmosphere furnace at 1300° C. for 10 hours to prepare polycrystalline YAG sintered bodies having a size of φ150 mm×20 mm and φ150 mm×30 mm, respectively.

With regard to the thus obtained polycrystalline YAG sintered bodies, as a result of selecting 10 random in-plane points and measuring the optical loss coefficient of each point, the optical loss coefficient of the polycrystalline YAG sintered body having the size of φ150 mm×20 mm exceeded 0.002 $cm^{-1}$, and the optical loss coefficient of the polycrystalline YAG sintered body having the size of φ150 mm×30 mm was 0.05 $cm^{-1}$ at a wavelength of 1064 nm where there is no absorption of light by Nd.

Comparative Example 2

A $Y_2O_3$ powder having an average grain size of 5 μm, an $Al_2O_3$ powder having an average grain size of 0.4 μm, and, as an additive element, a $Nd_2O_3$ powder having an average grain size of 5 μm were weighed in a predetermined amount, placed in a mixer/pulverizer, and subject to wet mixing for 5 hours with a ball mill which uses water as a solvent and alumina as a media to obtain a slurry. A polyvinyl alcohol aqueous solution was added as a binder to the slurry and mixed, dried, and thereafter spray-dried to obtain a granulated powder having an average grain size of 25 μm. A sintering agent (Si$(OC_2H_5)_4$) was additionally added thereto and mixed. Note that a binder containing basic aluminum chloride or lactic alumina was not added to the foregoing slurry.

Next, the granulated powder was placed in molds (φ210 mm×40 mm, φ210 mm×50 mm) and subject to cold press, and thereafter subject to CIP molding at 176 MPa. Next, the resulting compacts were heated in an air atmosphere furnace at 100° C. for 5 hours, and then heated at 900° C. for 2 hours. At this point, the relative density was roughly 57% in both compacts.

Next, the compacts were heated in a vacuum heating furnace at 200° C. for roughly half a day, while performing vacuum drawing, thereafter calcined in a vacuum heating furnace at 1750° C. for 20 hours while maintaining a degree of vacuum of $1\times10^{-2}$ Pa or less, and thereafter cooled at a cooling rate of 100° C./hour or less up to 1100° C., and subsequently cooled slowly. Next, the compacts were subject to HIP in an Ar atmosphere under the conditions of 1750° C., 147 MPa, and 4 hours, and heated in an air atmosphere furnace at 1300° C. for 10 hours to prepare polycrystalline YAG sintered bodies having a size of φ150 mm×20 mm and φ150 mm×30 mm, respectively.

With regard to the thus obtained polycrystalline YAG sintered bodies, as a result of selecting 10 random in-plane points and measuring the optical loss coefficient of each point, the optical loss coefficient of the polycrystalline YAG sintered body having the size of φ150 mm×20 mm was 0.01 $cm^{-1}$, and the optical loss coefficient of the polycrystalline YAG sintered body having the size of φ150 mm×30 mm was 0.1 $cm^{-1}$ at a wavelength of 1064 nm where there is no absorption of light by Nd.

Comparative Example 3

A compact (φ210 mm×60 mm) was sintered according to the same method as Example 1, and, after sintering, the compact was cooled at a cooling rate of 100° C./hour or less up to 1400° C., and subsequently cooled slowly. The sintered body removed from the mold had cracks. When the sintered body was subsequently subject to HIP treatment and atmospheric heat treatment in the same manner as Example 1, while there were cracks, it was possible to obtain a transparent YAG sintered body. Moreover, with regard to the thus obtained polycrystalline YAG sintered body, as a result of selecting 10 random in-plane points and measuring the optical loss coefficient of each point, the optical loss coefficient was 0.002 $cm^{-1}$ or less in each point at a wavelength of 1064 nm where there is no absorption of light by Nd.

Comparative Example 4

A compact (φ210 mm×60 mm) was sintered according to the same method as Example 1, and the compact was directly calcined at 1700 to 1900° C. for 10 hours without being subject to heat treatment in a vacuum heating furnace at 200 to 300° C. for roughly half a day. During the warming process, the degree of vacuum deteriorated to several Pa, and the degree of vacuum settled at $1\times10^{-2}$ Pa or less around the time of reaching 1700° C. After calcination, the sintered body removed from the mold was visibly warped, and the height difference when the sintered body was placed on a parallel face was 5 mm. When the sintered body was subsequently subject to HIP treatment and atmospheric heat treatment in the same manner as Example 1, a YAG sintered body with visible opaque nonuniformity was obtained. In particular, points where the warping was notable tended to also be opaque. Furthermore, because light could not be transmitted through the opaque parts, the light scattering coefficient could not be measured.

According to the present invention, a large and transparent polycrystalline YAG sintered body can be produced stably. The polycrystalline YAG sintered body according to the present invention is effective for use in a phosphor or a laser medium when an additive element is added thereto, and is effective for use as a window material that can be applied in harsh environments (plasma, etc.) when an additive element is not added thereto.

REFERENCE SIGNS LIST

1 Light source (halogen lamp)
2 Spectrometer
3 Lens
4 Lens
5 Chopper
6 Integrator
7 Baffle plate
8 Photodetector (photomultiplier)
9 Photodetector (photomultiplier)
10 Lock-in amplifier
11 Sample
12 Signal
13 Signal
14 Signal

The invention claimed is:

1. A polycrystalline YAG sintered body, wherein, dimensions of a smallest rectangular solid surrounding the polycrystalline YAG sintered body are A mm×B mm×C mm, a maximum value (A, B, C) is 150 mm or less, a minimum value (A, B, C) is more than 20 mm and 40 mm or less, and an optical loss coefficient when light of a wavelength of 300 to 1500 nm, excluding wavelengths which result in absorption of light by an additive element, is transmitted therethrough is 0.002 $cm^{-1}$ or less.

2. A polycrystalline YAG sintered body, wherein, dimensions of a smallest rectangular solid surrounding the polycrystalline YAG sintered body are A mm×B mm×C mm, a maximum value (A, B, C) is more than 150 mm and 300 mm or less, a minimum value (A, B, C) is more than 20 mm and 40 mm or less, and an optical loss coefficient when light of a wavelength of 300 to 1500 nm, excluding wavelengths which result in absorption of light by an additive element, is transmitted therethrough is 0.002 $cm^{-1}$ or less.

3. A method of producing a polycrystalline YAG sintered body, wherein a mixed powder containing a $Y_2O_3$ powder and an $Al_2O_3$ powder is molded to prepare a compact having a relative density of 60% or higher, the compact is sintered at 1600 to 1900° C. while maintaining a degree of vacuum of $1\times10^{-2}$ Pa or less in a warming step and a holding step, and, after sintering, a cooling rate is set to be 100° C./hour or less up to 1100° C. to produce a polycrystalline YAG sintered body, wherein, when dimensions of a smallest rectangular solid surrounding a YAG sintered body are A mm×B mm×C mm, a maximum value (A, B, C) is more than 150 mm and 300 mm or less, a minimum value (A, B, C) is more than 5 mm and 40 mm or less, and an optical loss coefficient when light of a wavelength of 300 to 1500 nm, excluding wavelengths which result in absorption of light by an additive element, is transmitted therethrough is 0.002 $cm^{-1}$ or less.

4. The method of producing the polycrystalline YAG sintered body according to claim 3, wherein the sintered body after cooling is subject to HIP treatment under conditions of 1600 to 1800° C. and 100 to 200 MPa.

5. The method of producing the polycrystalline YAG sintered body according to claim 4, wherein, after HIP treatment, annealing treatment is performed under conditions of in an atmosphere and at 1300 to 1500° C.

6. A method of producing a polycrystalline YAG sintered body according to claim 1, wherein a mixed powder containing a $Y_2O_3$ powder and an $Al_2O_3$ powder is molded to prepare a compact having a relative density of 60% or higher, the compact is sintered at 1600 to 1900° C. while maintaining a degree of vacuum of $1\times10^{-2}$ Pa or less in a warming step and a holding step, and, after sintering, a cooling rate is set to be 100° C./hour or less up to 1100° C.

7. The method of producing the polycrystalline YAG sintered body according to claim 6, wherein the sintered body after cooling is subject to HIP treatment under conditions of 1600 to 1800° C. and 100 to 200 MPa.

8. The method of producing the polycrystalline YAG sintered body according to claim 7, wherein, after HIP treatment, annealing treatment is performed under conditions of in an atmosphere and at 1300 to 1500° C.

* * * * *